Nov. 28, 1961  A. W. SERIO  3,010,688
COMBINED HOLDER AND STAND
Filed Oct. 24, 1958  2 Sheets-Sheet 1
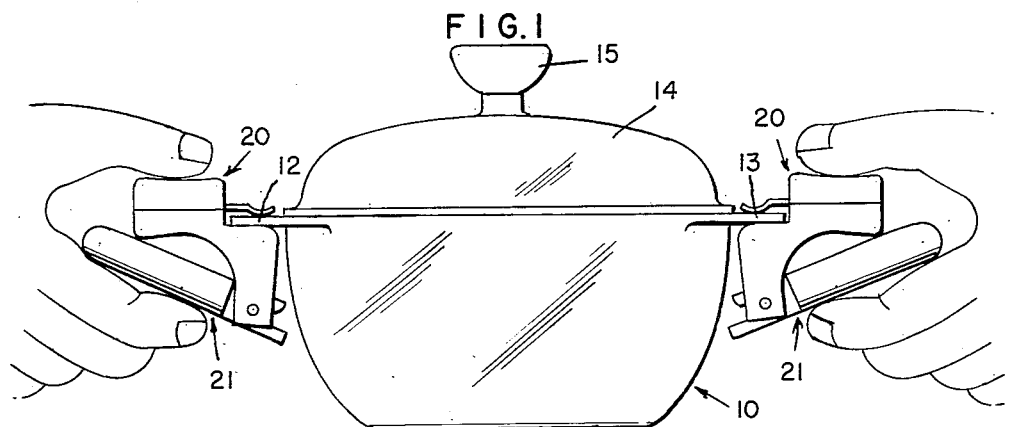
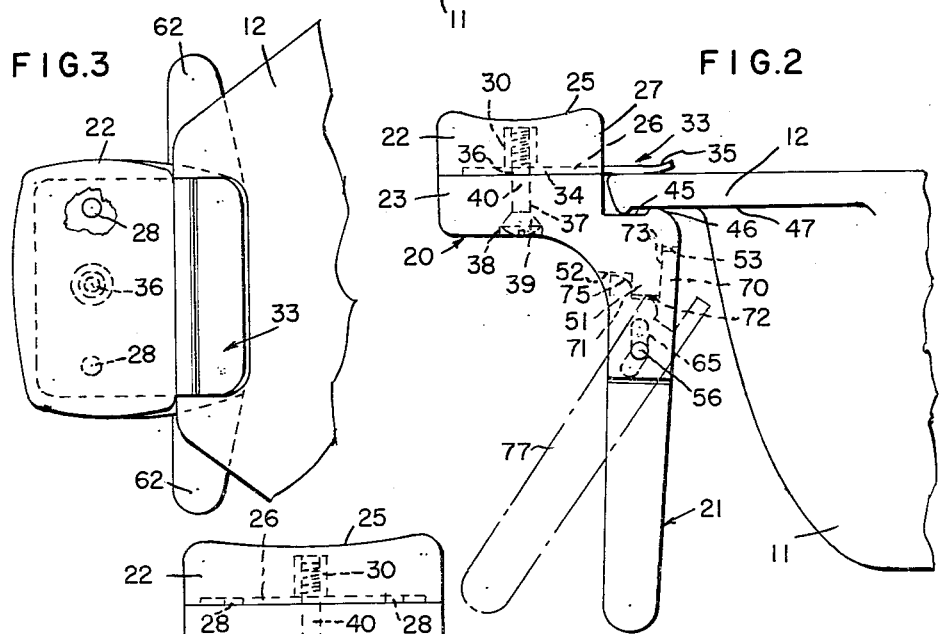
INVENTOR.
Anthony W. Serio
BY
ATTYS

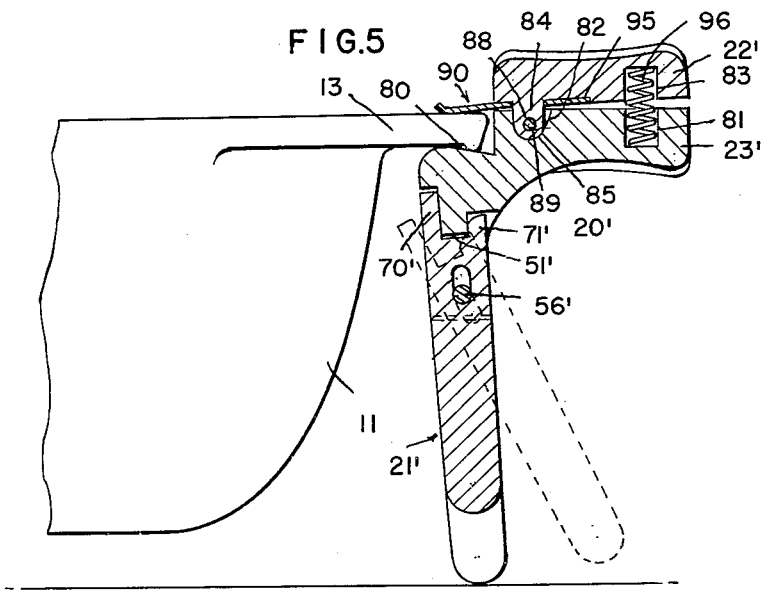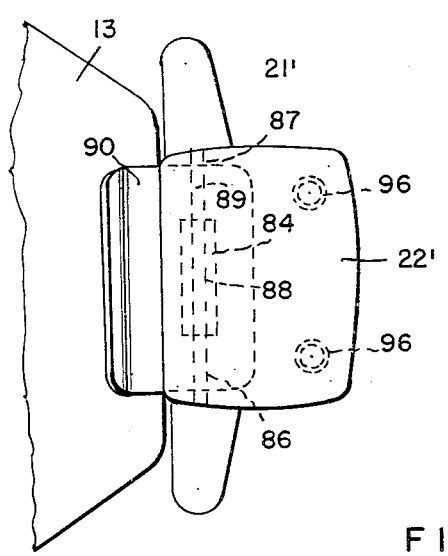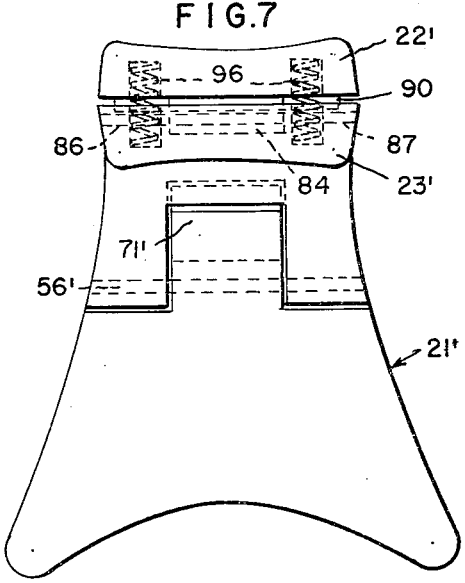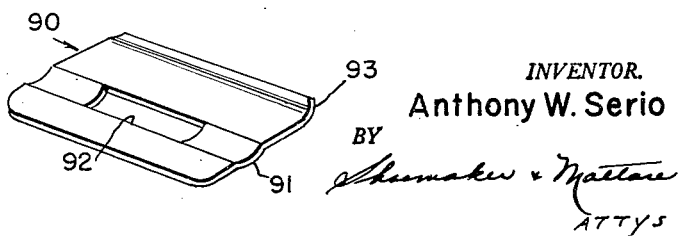

United States Patent Office 3,010,688
Patented Nov. 28, 1961

3,010,688
COMBINED HOLDER AND STAND
Anthony W. Serio, 1704 Caton Ave., Elmira, N.Y.
Filed Oct. 24, 1958, Ser. No. 769,438
13 Claims. (Cl. 248—145.6)

The present invention relates to a combined holder and stand, and more particularly to a holder and stand especially suited for supporting heated objects when transporting them or supporting them upon a surface.

The present invention is adapted for use with heated articles, such as casseroles or baking dishes formed of glass or similar material, wherein hot foods or the like are served directly from the oven. Such containers are ordinarily provided with some sort of handle for easily grasping the container, but such handles ordinarily become excessively hot when the container has been in an oven, and accordingly it is impractical to grasp the handle portions with a bare hand. As a result, it is necessary to employ bulky so-called pot holders formed of thick material to protect the hands of a person when carrying the heated container.

In addition, when it is desired to serve food directly from the container, special provision must be made for protecting the supporting surface of a table or the like due to the heat of the container. It is obvious that the finished surface of a table is not adapted to withstand the high heat of such containers, and accordingly it is a common practice to employ hot pads formed of a suitable heat insulating material in order to protect the supporting surface. Even when such hot pads are employed, highly finished surfaces are often damaged due to the heat being transferred through the supporting heat insulating pad causing damage to the finish of the table or the like.

It is accordingly highly desirable to provide a device which will serve the dual purpose of providing a heat insulating handle for carrying a baking dish or the like from place to place and, which will also serve as a support stand for retaining the heated container in position above a supporting surface and spaced a sufficient distance therefrom to prevent damage to the surface.

At the same time, such a device must be of such a construction so that it provides a pleasing appearance to the eye in order to provide an attractive stand for supporting a dish or the like in position upon a table, and the operation of the device must be of such a nature so as to be extremely simple and as automatic as possible since the containers which are being handled are extremely hot and the person employing the device must be assured that he will not touch a hot container, and furthermore will not have to perform an excessive amount of manipulation in order to properly operate the device. Accordingly, the present invention provides a very simple and compact arrangement which provides a very pleasing finished appearance, and which is substantially automatic in operation and can be manipulated with a minimum degree of effort.

In the arrangement according to the present invention, a handle portion is provided of heat insulating material to protect a person's hand, and includes a supporting surface upon which the handle portion of a dish or the like is received. The handle portion also includes a resilient spring member which is held in position by the handle portion spaced from the supporting surface thereof such that the handle portion of a baking dish or similar article is tightly clamped between the resilient spring and the supporting surface of the handle portion, thereby insuring that the container will be firmly retained in supported position by the device and accidental slipping of the article out of the device will be substantially eliminated. According to one modification of the invention, the handle portion includes a pair of pivotally interconnected members whereby a slight pressure upon opposite portions of the members will easily release the device from a supported article.

The handle portion also includes a depending tongue-like element formed integral therewith. A leg portion also formed of heat insulating material is provided with a pair of upstanding ears defining a groove therebetween for receiving the tongue-like element of the handle portion, one of the ears being of substantially greater length than the other of said ears, said one ear insuring that the leg portion does not pivot in one direction with respect to the handle portion. The other of the ears is provided with a rounded surface which is adapted to provide a clearance with the tongue-like element, this other ear being of substantially less length than the first mentioned ear whereby pivotal movement of the leg portion with respect to the handle portion is permitted in one direction.

A novel pivotal interconnection between the handle portion and the leg portion permits the leg portion to move toward and away from the handle portion to either lock the leg portion with respect to the handle portion for securely supporting a baking dish or the like, or to permit the leg portion to move away from the handle portion and subsequently pivot with respect thereto in order to provide a novel handle arrangement which occupies a minimum of vertical dimension. This novel pivotal interconnection includes a hinge pin supported by the handle portion and an elongated slot formed in the leg portion which receives the hinge pin.

The novel pivotal interconnection between the handle portion and leg portion of the present invention is an important feature since it permits the two portions to be pivoted into such a relationship with one another that the leg portion is pivoted upwardly against the undersurface of the handle portion providing an arrangement which can be quite easily grasped in one's hands, and thereby substantially reducing the vertical dimension of the device such that when gripping a casserole dish or the like, the dish may be inserted within an oven in a space of limited vertical dimensions, and in fact, the device according to the present invention occupies less vertical space than the dish itself whereby the space within which the dish may be placed is only limited by the vertical dimension of the dish. This arrangement is, of course, far superior to prior art structures wherein the leg portions are fixed to the handle portions whereby the supporting devices are of a fixed vertical dimension, thereby limiting the space within which a supported dish may be placed.

The construction according to the present invention is also substantially automatic in operation since after employing the device in pivoted position as previously described as a handle, the leg portions are released whereupon they automatically drop downwardly into proper relationship with respect to the handle portion such that upon placing the invention device upon a supporting surface, the weight of the baking dish or the like causes the leg portion and handle portion to be urged into positive locking engagement with one another for securely supporting the dish. The leg portions may subsequently be again folded into position to serve as a handle portion simply by raising the device and supported dish away from the supporting surface whereupon the leg portions again drop away from the handle portions into position permitting pivotal movement thereof upwardly into engagement with the handle portion.

An object of the present invention is to provide a new and novel combined holder and stand which is particularly adapted for supporting heated containers and completely insulating them from a person's hands or from a supporting surface.

Another object of the invention is the provision of a combined holder and stand which may be quickly and easily snapped onto a dish or the like and which will remain securely in engagement therewith.

A further object of the invention is to provide a combined holder and stand which permits insertion of a supported container in a space of limited vertical dimension.

A further object of the invention is to provide a combined holder and stand which can be easily folded into handle position, and which automatically drops into proper position for either permitting pivotal movement of the leg with respect to the handle portion or in proper position for providing a positive interlocking between the handle portion and the leg portion.

A still further object of the invention is to provide a combined holder and stand which is simple and inexpensive in construction, providing a very compact arrangement, and which is sturdy and reliable in operation.

Other objects and many attendant advantages of the invention will become more apparent when considered in connection with the accompanying specification and drawings wherein:

FIG. 1 illustrates the present invention as employed with a casserole baking dish;

FIG. 2 is an enlarged view of the device illustrating the supporting position thereof;

FIG. 3 is a top view of the device shown in FIG. 2;

FIG. 4 is an end view of the device shown in FIG. 2;

FIG. 5 is a sectional view of a modification of the present invention;

FIG. 6 is a top view of the device shown in FIG. 5;

FIG. 7 is an end view of the device shown in FIG. 5; and

FIG. 8 is a perspective view of the resilient spring element employed in the device shown in FIG. 5.

Referring now to the drawings wherein like reference characters designate corresponding parts throughout the several views, a casserole baking dish is indicated generally by reference numeral 10 in FIG. 1 and comprises a lower hollow bowl-like portion 11 having a pair of diametrically opposite handle members 12 and 13 formed integral therewith and extending upwardly therefrom. A conventional dome-shaped coved member 14 is mounted on the upper edge of bowl-like portion 11 and has a knob 15 mounted at the upper central portion thereof for facilitating lifting of the top 14. As seen most clearly in connection with FIGS. 2–4, the improved combined holder and stand according to the present invention comprises a handle portion indicated generally by reference numeral 20 and a leg portion 21 which is pivotally connected to the handle portion.

Handle portion 20 comprises two separate members 22 and 23, each of which is formed of a suitable heat insulating material, such as plastic or the like, the upper member 22 having the upper surface 25 thereof dished out to provide a surface which can be more easily gripped by the thumb of a person when grasping the handle portion. The lower surface of member 22 is substantially flat and is provided with a recess 26 which opens through lateral surface 27 of member 22, member 22 having formed integral therewith a pair of downwardly extending lugs 28 which project downwardly within recess 26 to a point which is substantially in the plane of the remaining lower surface of the member. An internally threaded hollow brass nut 30 is molded into handle member 22 during manufacture thereof, the hollow cavity within nut member 30 communicating with recess 26.

A plate-like resilient spring 33 includes a main flat body portion 34 which is received within recess 26 such that the lower surface of the spring is flush with the lower surface of handle member 22.

Spring member 33 projects laterally outwardly of handle member 22 and includes an arcuate end portion 35 which curves in a downward direction such that the spring normally exerts a downward pressure upon a member in engagement with the lower surface thereof. Spring member 33 is provided with a pair of openings which receive lugs 28 snugly therein whereby the spring is retained in proper operative position relative to handle member 22. The spring is also provided with a central opening 36 formed therethrough for a purpose hereinafter described.

Handle member 23 includes a substantially flat upper surface which bears against the lower surface of handle member 22 and the lower surface of spring member 33 whereby the spring is clamped between the handle members 22 and 23. An opening 37 extends upwardly through the upper surface of handle member 23 and tapers outwardly at 38 at the lower end thereof to provide a tapered opening for receiving a correspondingly tapered head 39 of a threaded screw 40 which projects upwardly through opening 37 and opening 36 in the spring and has its upper threaded end threaded within nut 30 embedded in the member 22. In this manner, the enlarged head 39 of the screw 40 is recessed inwardly of the lower surface of handle member 23 such that a person gripping the upper surface of handle member 22 and the lower surface of handle member 23 will not engage the screw 40. Screw 40 serves to maintain the two handle members in proper position relative to one another and maintains the spring in clamped position between the handle members.

A supporting surface 45 is formed on handle member 23 and an upstanding lip 46 is formed adjacent one edge thereof. Supporting surface 45 is adapted to receive the lower surface 47 of handle member 12 of the aforementioned casserole dish, the handle portion being firmly clamped between supporting surface 45 and the undersurface of the arcuate end portion 35 of the spring member. This arrangement serves to effectively clamp the handle portion of the invention device to the handles of the casserole dish or the like and prevents accidental release of the handles of the dish therefrom. It is apparent that the device can be easily clamped to the handle of a dish merely by forcing the handle between the spring and the supporting surface 45, and subsequently the invention device may be removed by pulling it away from the handle of the dish.

As seen most clearly in FIG. 4 of the drawings, handle member 23 includes a pair of spaced depending portions 50, a depending tongue-like portion 51 being formed therebetween as seen most clearly in FIG. 2 of the drawings. Cut-out portions 52 and 53 are formed in the lower portion of handle member 23 on opposite sides of the tongue-like portion 51. A pair of aligned openings 55 is provided through spaced portions 50 of handle member 23, and a hinge pin 56 is press fitted within these openings.

As seen most clearly in FIG. 4, leg portion 26 comprises an integral member having an arcuate lower surface 60 and sloping side surfaces 61 which intersect to define two leg members 62 for supporting the device on a suitable surface. An upstanding central portion 63 projects upwardly above the upper surfaces 64 formed at either side thereof. An elongated slot 65 is formed laterally through upstanding portion 63 and is adapted to be aligned with openings 55 such that hinge pin 56 extends through aligned openings 55 and 65 for pivotally connecting the leg portion to the handle portion.

As seen most clearly in FIG. 2, elongated slot 65 permits movement in a vertical direction of leg portion 21 with respect to handle portion 20 whereby the leg portion may be moved either into interlocking relationship with the handle portion or may be pivoted with respect thereto. A pair of ears 70 and 71 is formed at the upper end of the leg portion, and a groove 72 is defined therebetween, said groove being adapted to receive tongue-like element 51 on handle member 23. Ear 70 is of substantially greater length than ear 71, the dimensions of elongated slot 65 and ear 70 being such that ear 70 prevents rotation of the leg member in a counterclockwise direction as seen in FIG. 2 about hinge pin 56 beyond the point where ear 70 engages the lateral surface 73 of cutout portion 53.

Ear 71 includes a rounded surface 75 adjacent the tongue-like element 51, ear 71 being so dimensioned that when leg member 21 is in its lower position such that hinge pin 56 is at the upper end of elongated slot 65, ear 71 will clear the lower edge of tongue-like element 51 on handle member 23, thereby permitting the leg member to be pivoted around as indicated by phantom line 77, the leg portion being capable of pivotal movement upwardly until the surface of leg portion 21 engages the undersurface of handle member 23.

As seen in FIG. 1, a pair of the invention devices is mounted upon the opposite handles of a baking dish, and the leg portions 21 have been pivoted upwardly into what may be termed a handle position, whereupon a person may grasp the device with the thumb resting within the dish portions of handle member 22 and the remaining fingers gripping the downwardly facing surface of the leg portions. In this position, it is evident that the vertical dimension of the invention device is reduced to a minimum, and a very effective arrangement is provided whereby the device may be easily gripped in the hand.

The devices may be employed as shown in FIG. 1 for carrying the casserole dish when in heated condition, and a person's hands will be protected due to the heat insulating characteristics of the components of the invention device. Upon arriving at a table or the like where it is desired to place the casserole dish in serving position, a person merely transfers some of the fingers so as to grip the handle portion 20 between the thumb and some fingers, and then the remaining fingers release the leg portion 21. Upon such release, leg portions 21 will pivot downwardly under the influence of gravity such that ears 70 of the leg portions engage the lateral surfaces 73 on the handle members 23. This positively limits the inward pivotal movement of the leg portions insuring that the leg portions do not swing inwardly and strike the supported dish. The entire assembly may then be lowered onto a supporting surface whereupon the weight of the dish causes the handle portion to move downwardly with respect to the leg portions whereupon tongue-like element 51 is received within groove 72, and the weight of the supported dish will retain the leg portions and handle portions in positively interlocked engagement with one another whereby accidental pivotal movement therebetween is positively prevented. The handle portions may subsequently be gripped in the hands and the entire assembly lifted away from the supporting surface whereupon leg portions 21 will drop downwardly such that the hinge pin 56 moves upwardly within elongated slot 65, and the leg portions may be pivoted as aforedescribed. It is evident that the invention device may be removed from the supported dish by pulling the devices away from the handles on the dish such that the handles of the dish will snap out from between resilient spring 33 and the supporting surface 45 on the handle portions.

Referring now to FIGS. 5-8 of the drawings, a modification is illustrated wherein the lower portions of the handle portions and the leg portions are identical with the arrangement shown in FIGS. 1-4, the mode of operation being exactly the same, and accordingly no further description of this particular construction is necessary. Components in the modification shown in FIGS. 5-8 similar to those shown in FIGS. 1-4 have been given the same reference numerals primed. The modification shown in FIGS. 5-8 differs from that previously described in the arrangement of the handle portion. The handle member 23' has a lower portion which is substantially identical with member 22 shown in FIGS. 1-4, but supporting surface 80 slopes downwardly and inwardly as seen most clearly in FIG. 5 for retaining the handle 13 of the casserole dish in proper position, and serving to prevent accidental removal of the handle 13 away from the device. A substantially cylindrical cavity 81 is provided in the upper surface of handle portion 23' and a cavity 82 is also provided within the upper surface of handle member 23', the walls of cavity 82 tapering downwardly and inwardly as seen in FIG. 5 for a purpose hereinafter described.

Upper handle member 22' as seen in FIG. 5 is provided with a substantially cylindrical cavity 83, and a downwardly extending portion 84 formed integral with the undersurface of member 22' is provided with a rounded lower end 85 which is received within the rounded lower end of opening 82, the portion 84 extending only partially across the width of member 22', and cavity 82 in handle member 23' being coextensive with portion 84 whereby portion 84 is received within opening 82 and is adapted for pivotal movement with respect thereto due to the tapered configuration of the walls of cavity 82.

As seen most clearly in FIGS. 6 and 7, aligned openings 86 and 87 are provided laterally through handle member 23' on opposite sides of cavity 82 therein, openings 86 and 87 being in communication with the cavity. An opening 88 is provided through portion 84 of upper handle member 22', and a hinge pin 89 is press fitted through aligned openings 86, 87 and 88 for pivotally interconnecting handle members 22' and 23'.

Referring now to FIG. 8, a novel resilient spring indicated generally by reference numeral 90 comprises a plate-like element having a longitudinally extending depressed portion 91 formed at an intermediates point thereof, an opening 92 being formed within the central portion of the depressed portion 91. One edge portion 93 of spring member 90 is provided with an arcuate configuration for providing a resilient pressure downwardly upon a member disposed therebeneath.

As seen in FIG. 5, the undersurface of upper handle member 22' is provided with a recess 95 which receives spring member 90, portion 84 of handle member 22' being received snugly within opening 92 in the spring, and the spring projecting laterally outwardly of handle member 22'.

A compression spring 96 is disposed within cavities 81 and 83 in handle members 23' and 22' respectively whereby handle member 22' is normally pivoted in a counterclockwise direction about pivot pin 89 as seen in FIG. 5. This action forces spring member 90 downwardly such that the handle 13 of the supported casserole dish is firmly clamped between the undersurface of the spring and the supporting surface 80.

It is evident that when it is desired to attach the device to the handle of a dish, the handle portions 22' and 23' may be grasped between the fingers and pressed toward one another to urge spring 90 away from supporting surface 80 whereupon the handle of the casserole dish may be easily slid therebetween. Subsequent release of pressure on the upper surface of handle member 22' will maintain the handle of the dish firmly clamped in position, and the device may be supported in the hand by placing the fingers under the lower surface of handle member 23'. The manner of employing the device shown in FIGS. 6-8 is believed apparent when considered in connection with the description of the device shown in FIGS. 1-4.

It is apparent from the foregoing that there is provided a new and novel combined holder and stand especially adapted for supporting heated containers and for insulating a person's hands and a supporting surface therefrom. The device may be securely snapped onto the handles of a container, and the leg portions of the device are pivotally interconnected to the handle portions thereof for permitting insertion in a limited vertical space. The leg portions automatically drop into position for pivotal movement with respect to the handle portions or for movement into interlocking relation therewith. The device may be very easily operated and operates in a substantially automatic manner. The structure according to the present invention is quite simple and inexpensive and compact, and yet is very sturdy and reliable in operation.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. A combined holder and stand which comprises a handle portion adapted to receive a dish or the like, and a leg portion adapted to rest upon a supporting surface, said leg portion being pivotally interconnected with said handle portion, and means for interlocking said handle portion and said leg portion in supporting position such that the handle portion and leg portion have a fixed angular relationship to one another, said handle portion extending laterally of said leg portion when the holder and stand is in operative supporting position to permit ready manual grasping of said handle portion.

2. Apparatus as defined in claim 1 wherein said means for interlocking said handle portion and said leg portion includes a tongue member formed on one of said portions and a groove formed on the other of said portions for receiving said tongue member, said tongue member and said groove having interengageable surfaces preventing rotation of said leg portion with respect to said handle portion to maintain the device in supporting position.

3. A combined holder and stand which comprises a handle portion including a supporting surface and a resilient spring for clamping a dish or the like between said spring and said supporting surface, and a leg portion adapted to rest on a supporting surface, said leg portion being pivotally interconnected with said handle portion, and means for interlocking said handle portion and leg portion in supporting position such that the handle portion and leg portion have a fixed angular relationship to one another, said handle portion extending laterally of said supporting surface when the holder and stand is in operative position to permit ready manual grasping of said handle portion.

4. Apparatus as defined in claim 3 wherein one of said portions includes a tongue member formed thereon, the other of said portions having a pair of spaced ears formed thereon, said tongue portion being adapted to be received within the space between said two ears, said tongue member and said groove having interengageable surfaces preventing rotation of said leg portion with respect to said handle portion.

5. A combined holder and stand which comprises a handle portion including a supporting surface and a resilient spring for clamping a dish or the like between said spring and said supporting surface, and a leg portion adapted to rest on a supporting surface, said leg portion being pivotally interconnected with said handle portion, and means for interlocking said handle portion and leg portion in supporting position such that the handle portion and leg portion have a fixed angular relationship to one another, said handle portion extending laterally of said leg portion when the holder is in operative load-supporting position to permit ready manual grasping of said handle portion, one of said portions including a tongue member formed thereon, the other of said portions having a pair of spaced ears formed thereon and defining a groove therebetween, said tongue portion being adapted to be received within said groove, said tongue member and said groove having interengageable surfaces preventing rotation of said leg portion with respect to said handle portion, one of said ears being considerably shorter than the other of said ears and including a rounded edge portion to facilitate pivotal movement of said leg portion with respect to said handle portion.

6. A combined holder and stand which comprises a handle portion, said handle portion including attaching means for attaching the handle to a portion of a dish or the like, and a leg portion adapted to be mounted upon a supporting surface, said leg portion being pivotally interconnecting with said handle portion, said pivotal interconnection including a pivot pin supported by one of said portions, the other of said portions having an elongated slot formed therein for receiving said pin, said handle portion extending laterally of said attaching means when the holder and stand is in operative position to permit ready manual grasping of said handle portion, and means for locking said handle portion and leg portion in supporting position such that the handle portion and leg portion have a fixed angular relationship to one another.

7. Apparatus as defined in claim 6 wherein one of said portions has a pair of ears defining a groove therebetween, the other of said portions having a tongue formed thereon adapted to be inserted in said groove, said tongue and groove providing a positive interconnection between said portions when the apparatus is employed as a stand.

8. A combined holder and stand which comprises a handle portion having a supporting surface formed thereon, a resilient spring member supported by said handle portion and spaced from said supporting surface for receiving a portion of a dish or the like between said spring member and said supporting surface, said handle portion having a tongue-like element depending therefrom, a leg portion adapted to be mounted upon a supporting surface, said leg portion including a pair of spaced ears formed at one end thereof, said ears defining a groove therebetween for receiving said tongue-like element, a hinge pin mounted upon said handle portion, and an elongated slot formed through said leg portion and extending between opposite lateral portions thereof, said hinge pin being received in said slot and said slot being of sufficient length to permit movement of said leg portion away from said handle portion and pivotal movement with respect thereto, such that the handle portion and leg portion have a fixed angular relationship to one another, said handle portion extending laterally of said supporting surface when the holder and stand is in operative position to permit ready manual grasping of said handle portion.

9. Apparatus as defined in claim 8 wherein said handle portion includes a pair of depending spaced portions defining a yoke, and said leg portion including an upstanding portion fitting between said spaced portions of the yoke thereby permitting free pivotal movement of said leg portion with respect to said handle portion.

10. A combined holder and stand which comprises a handle portion comprising two members formed of heat insulating material, a resilient spring having a portion thereof clamped between said two members and projecting outwardly therefrom, means securing said two members in clamping relationship to one another, a supporting surface defined by one of said members and spaced from said spring for receiving a portion of a dish or the like, said one member including a pair of depending spaced portions defining a space therebetween, a depending tongue-like element formed on said one member intermediate said base portions, a leg portion formed of heat insulating material and including an upstanding central portion received within said space between said spaced portions of the handle portion, said cenral portion of the leg portion including a pair of spaced ears defining a groove therebetween receiving said tongue-like element, one of said ears being of less length than the other of said ears, said one ear including a rounded surface formed on the portion thereof adjacent said tongue-like element for permitting pivotal movement of said leg portion with respect to said handle portion, said handle portion including a hinge pin mounted thereon, said leg portion having an elongated slot formed therein receiving said hinge pin.

11. A combined holder and stand which comprises a handle portion including a pair of members pivotally interconnected with one another, a resilient spring member mounted between said members, means normally urging said members in one pivotal direction with respect to one another, said members being formed of heat insulating material, one of said members including a depending tongue-like element, a leg portion formed of heat insulating material and including a pair of upstanding ears defining a groove therebetween for receiving said tongue-like element, one of said ears being of substantially less length than the other of said ears and including a rounded portion adjacent said tongue-like element, a hinge pin supported by said one member of the handle portion, and an elongated slot formed in said leg portion for receiving said hinge pin.

12. A combined holder and stand which comprises a handle portion including a pair of members pivotally interconnected with one another, a resilient spring member mounted between said members, means normally urging said members in one pivotal direction with respect to one another, said members being formed of heat insulating material, one of said members including a depending tongue-like element, a leg portion formed of heat insulating material and including a pair of upstanding ears defining a groove therebetween for receiving said tongue-like element, one of said ears being of substantially less length than the other of said ears and including a rounded portion adjacent said tongue-like element, a hinge pin supported by said one member of the handle portion, and an elongated slot formed in said leg portion for receiving said hinge pin, said resilient spring comprising a plate-like element having an opening formed therethrough, one of said members of said handle portion including a portion extending through the opening in said spring for retaining said spring in proper operative position.

13. A combined holder and stand which comprises a handle portion having a supporting surface formed thereon, a resilient spring member supported by said handle portion and spaced from said supporting surface for receiving a portion of a dish or the like between said spring member and said supporting surface, said handle portion having a tongue-like element depending therefrom, a leg portion adapted to be mounted upon a supporting surface, said leg portion including a pair of spaced ears formed at one end thereof, said ears defining a groove therebetween for receiving said tongue-like element, a hinge pin mounted upon said handle portion, and an elongated slot formed through said leg portion and extending between opposite lateral portions thereof, said hinge pin being received in said slot and being of sufficient length to permit movement of said leg portion away from said handle portion and pivotal movement with respect thereto, one of said ears being substantially longer than the other of said ears, said one ear preventing pivotal movement of said leg portion in one direction with respect to said handle portion, said other ear having a rounded surface formed thereon for providing clearance with said tongue-like element and permitting pivotal movement of said leg portion with respect to said handle portion.

References Cited in the file of this patent

UNITED STATES PATENTS

| 1,748,005 | Vlavianos | Feb. 18, 1930 |
| 1,820,592 | Bauer | Aug. 25, 1931 |
| 2,211,030 | Rutenber | Aug. 13, 1940 |
| 2,547,844 | Wickland | Apr. 3, 1951 |
| 2,815,884 | Nilsson | Dec. 10, 1957 |

FOREIGN PATENTS

| 570,249 | Great Britain | June 28, 1945 |